US012756355B2

(12) United States Patent
Grant

(10) Patent No.: US 12,756,355 B2
(45) Date of Patent: Oct. 6, 2026

(54) FOLDABLE PHOTOVOLTAIC ASSEMBLY FOR A PORTABLE SOLAR ENERGY SYSTEM

(71) Applicant: CEP-IP LTD, Cambridge (GB)

(72) Inventor: Thomas McGregor James Grant, Cambridgeshire (GB)

( * ) Notice: Subject to any disclaimer, the term of this patent is extended or adjusted under 35 U.S.C. 154(b) by 0 days.

(21) Appl. No.: 18/691,601

(22) PCT Filed: Sep. 13, 2022

(86) PCT No.: PCT/EP2022/075384
§ 371 (c)(1),
(2) Date: Mar. 13, 2024

(87) PCT Pub. No.: WO2023/037001
PCT Pub. Date: Mar. 16, 2023

(65) Prior Publication Data

US 2025/0202415 A1 Jun. 19, 2025

(30) Foreign Application Priority Data

Sep. 13, 2021 (EP) .................................... 21196430

(51) Int. Cl.
*H02S 30/20* (2014.01)
*H02S 10/40* (2014.01)
*H02S 20/30* (2014.01)

(52) U.S. Cl.
CPC .............. *H02S 30/20* (2014.12); *H02S 10/40* (2014.12); *H02S 20/30* (2014.12)

(58) Field of Classification Search
CPC .......... H02S 10/40; H02S 20/30; H02S 20/32; H02S 30/10; H02S 30/20
See application file for complete search history.

(56) References Cited

U.S. PATENT DOCUMENTS

2018/0306467 A1* 10/2018 Grant .................... F24S 25/617

OTHER PUBLICATIONS

Boake, "Hinge and Pin Connections", https://www.tboake.com/SSEF1/pin.shtml, All Pages, 2020. (Year: 2020).*

* cited by examiner

*Primary Examiner* — Daniel P Malley, Jr.
(74) *Attorney, Agent, or Firm* — Eugenio J. Torres-Oyola; Victor M. Rodriguez-Reyes; Rafael Rodriguez-Reyes

(57) ABSTRACT

The present invention discloses a photovoltaic assembly for a portable solar energy system, the photovoltaic assembly comprising: a row of interconnected photovoltaic laminates, each photovoltaic laminate comprising a pair of longitudinal and transverse side edges having an internal and an external major surface; a foldable stiffening or supporting structure comprising articulated members, the foldable stiffening or supporting structure being movable between a folded position and an operative position; wherein it further comprises at least two support elements, each support element being attached at least to the internal major surface of longitudinal side edges of adjacent photovoltaic laminates, each support element having a closed cross-section and comprising a first lateral face perpendicular to the internal major surface of the photovoltaic laminate; and wherein one or more articulated members of the stiffening or supporting structure are connected in an articulated manner to the first lateral face of the corresponding support element.

11 Claims, 5 Drawing Sheets

FOLDABLE PHOTOVOLTAIC ASSEMBLY FOR A PORTABLE SOLAR ENERGY SYSTEM

TECHNICAL FIELD

The present invention relates to the field of portable solar energy systems. In particular, the present invention relates to the field of photovoltaic assemblies which ease the transport and installation of photovoltaic laminates (photovoltaic surface without a complete peripheral frame) for a solar energy collection system.

The invention provides a photovoltaic assembly for a portable solar system.

BACKGROUND ART

Photovoltaic panels or laminates are widely used to generate electricity from sunlight. Photovoltaic panels or laminates are usually fixed on surfaces like roofs, building facades, on the ground, etc. using supporting structures, which may be known as photovoltaic mounting systems or solar module racking, among others. Such structures may differ depending on whether they support photovoltaic panels or photovoltaic laminates, as they are designed to be attached to their supporting structures in different ways, the main reason being that photovoltaic panels usually comprise a perimeter frame that provides structural integrity, whereas photovoltaic laminates usually lack any perimeter frame. Usually, photovoltaic panels are more robust than photovoltaic laminates. Supporting structures should take into account the differences between photovoltaic laminates and photovoltaic panels.

A solar panel or laminate performs the best when its surface is substantially perpendicular to the sun's rays, which change continuously over the course of the day and season. The supporting structures of the photovoltaic panels or laminates are also often used to orientate the photovoltaic panels or laminates in regard to solar radiation to maximize their energy production. Said supporting structure may be fixed, i.e., the photovoltaic panels or laminates have a fixed orientation, or may tilt, i.e., the orientation of the photovoltaic panels or laminates may vary depending on the position of the sun.

A solar energy system typically comprises one or more photovoltaic assemblies, which typically comprise one or more photovoltaic panels or laminates and a supporting structure.

Photovoltaic assemblies are usually installed at locations remote from its manufacturing site. Consequently, there is a need to transport the energy system components from their manufacturing site to the installation site where they will be assembled. Therefore, it is advantageous to provide a solar energy system that can be assembled in optimal conditions off-site and easily transported, as this can provide a significant cost reduction, among other benefits.

Besides being transported from the manufacturing site, or any intermediate storage site, to the location where the solar energy system is to be installed, the photovoltaic assemblies need to be mounted or installed. Consequently, it is advantageous if the photovoltaic assemblies of a solar energy system can be easily installed, as this can provide a significant time and cost reduction, an increase in worker safety, etc.

WO 2010/098806 A1 discloses a photovoltaic assembly comprising an array of photovoltaic laminates supported on a perimetral frame formed by top and bottom beams, side beams, and intermediate beams shared between two photovoltaic laminates, and a stiffening device formed by interconnected profiles. The stiffening device is configured to be transitioned between an operative position, in which the stiffening device protrudes from a lower side of the photovoltaic assembly and provides support and strengthening thereto, and a folded position, in which the stiffening device is maintained in its entirety within a receiving zone defined by the perimeter frame of the photovoltaic assembly. Said receiving zone is disclosed to have a height of no more than 8 inches thereby facilitating transport of the photovoltaic assembly.

BRIEF DESCRIPTION OF THE INVENTION

In order to provide a photovoltaic assembly for a solar energy system which can be easily transported, assembled and, if necessary, disassembled, to be transported to a further location, the present invention discloses a photovoltaic assembly for a portable solar energy system, the photovoltaic assembly comprising: a row of interconnected photovoltaic laminates, each photovoltaic laminate having an internal and an external major surface; a foldable stiffening and/or supporting structure comprising articulated members, the foldable stiffening or supporting structure being movable between a folded position and an operative position;

wherein the photovoltaic assembly further comprises at least two support elements, each support element being attached at least to the internal major surface of two adjacent photovoltaic laminates, each support element having a closed cross-section and comprising a first lateral face perpendicular to the internal major surface of the photovoltaic laminate; and wherein one or more articulated members of the foldable stiffening and/or supporting structure are connected in an articulated manner to the first lateral face of the corresponding support element.

In particular, the present invention discloses a photovoltaic assembly for a portable solar energy system, the photovoltaic assembly comprising: a row of interconnected photovoltaic laminates, each photovoltaic laminate comprising a pair of longitudinal and a pair of transverse side edges and defining an internal and an external major surface; a foldable stiffening and/or supporting structure comprising articulated members, the foldable stiffening and/or supporting structure being movable between a folded position and an operative position; wherein the stiffening and/or supporting structure further comprises at least two support elements, each support element being attached at least to the internal major surface of longitudinal side edges of adjacent photovoltaic laminates, each support element having a closed cross-section and comprising a first lateral face perpendicular to the internal major surface of the photovoltaic laminate; and wherein one or more articulated members of the foldable stiffening and/or supporting structure are connected in an articulated manner to the first lateral face of the corresponding support element.

According to the present invention, the row of interconnected photovoltaic laminates defines a longitudinal axis and the support elements of the stiffening and/or supporting structure are arranged perpendicular to said longitudinal axis.

According to the present invention, in the folded position of the foldable stiffening and/or supporting structure a face of the articulated members may be substantially coplanar with the internal major surface of the photovoltaic laminate, that is to say, a face of the articulated members may be substantially in contact with the internal major surface of the photovoltaic laminate.

According to the present invention, in the folded position of the foldable stiffening and/or supporting structure a face of the articulated member may be substantially parallel to the internal major surface of the photovoltaic laminate. In such case, the distance between the internal surface of the photovoltaic panel and said face of the articulated member may be less than 5 cm, preferably less than 3 cm, more preferably less than 2 cm, even more preferably less than 1 cm.

According to the present invention, in the folded position of the foldable stiffening and/or supporting structure a face, of the support element, farthest from the internal major surface of the photovoltaic laminate, may be substantially coplanar with a face, of the articulated member, farthest from the internal major surface of the photovoltaic laminate.

According to the present invention, in the folded position of the foldable stiffening and/or supporting structure a face of the articulated member may be in contact with the internal major surface of the photovoltaic laminate.

According to the present invention, the support element may define a first distance from the internal major surface of the photovoltaic laminate to the edge, of the first lateral face, farthest from said internal major surface in a direction perpendicular to said internal major surface; and the articulated members of the foldable stiffening and/or supporting structure, in its folded position, may define a second distance from the internal major surface to the edge, of the articulated member, farthest from said internal major surface in a direction perpendicular to said internal major surface; said first distance being equal or greater than said second distance. This provides a very compact arrangement of the photovoltaic assembly with the stiffening and or supporting structure in its folded position wherein the articulated members do not protrude from the support element, so that in its folded position, the photovoltaic assembly has a reduced thickness when compared to other photovoltaic assemblies known in the art. Preferably, said first distance is equal to said second distance, which means that, in the folded position, the articulated members do not protrude from the support element. Moreover, in embodiments wherein the distal surfaces of the support element and of the articulated members are flat, this means that said surfaces are substantially coplanar.

Alternatively, said second distance may be equal or greater than said first distance. In cases wherein the articulated members or any auxiliar element thereof; as for example, reinforcing truss interconnecting one or more articulated members; protrudes from the support element due to structural needs, said protrusion is preferably kept as low as possible.

According to the present invention, it is accepted that part of the foldable stiffening and/or supporting structure may protrude from the support element, although it is preferred that it protrudes minimally to reduce the space required for the transport of the photovoltaic assembly. According to the present invention, in its folded position, a longitudinal axis of the support element and a longitudinal axis of the articulated members may be substantially parallel to the photovoltaic laminate. This provides for a compact arrangement of the stiffening and/or supporting structure when it is in its folded position.

According to the present invention, in its operative position, the foldable stiffening and/or supporting structure may be configured to support the photovoltaic assembly.

According to the present invention, the support element may comprise a second lateral face opposite the first one.

According to the present invention, two or more articulated members of the foldable stiffening and/or supporting structure may be connected in an articulated manner to the first lateral face of the support element.

According to the present invention, one or more articulated members of the foldable stiffening and/or supporting structure may be connected in an articulated manner to the second lateral face of the support element.

According to the present invention, the support element may be attached to the internal and to the external major surface of two adjacent photovoltaic laminates.

According to the present invention, the support element may comprise on its upper side at least one clamping unit for clamping side edges of adjacent photovoltaic laminates, which may be provided with a protective cover.

According to the present invention, the support element may be attached to the adjacent laminates by a T-shaped member extending from the upper side of said support element, said T-shaped member together with the upper side of the support element defining two grooves for the reception of side edges of adjacent laminates, said side edges being preferably provided with a protective cover. That is to say, the at least one clamping unit may comprise a T-shaped member extending from the upper side of the support element, said T-shaped member together with the upper side of the support element defining two grooves for the reception of side edges of adjacent laminates, which may be provided with a protective cover. Said T-shaped member may be integral with the support element or may be attached to it by weld, glue, screws, or any other suitable fastening means.

According to the present invention, the support element may be attached to the adjacent laminates by an auxiliary member, said auxiliary member being attached to the upper side of the support element, said auxiliary member defining two grooves for the reception of side edges of adjacent laminates, said side edges being preferably provided with a protective cover. That is to say, the at least one clamping unit may comprise an auxiliary member defining two grooves for the reception of side edges of adjacent laminates, which may be provided with a protective cover. Said auxiliary member may be attached to the support element by weld, glue, screws, or any other suitable fastening means. It could also be integral with the support element.

According to the present invention, the support element may be attached to the adjacent laminates by a corresponding auxiliary member, each auxiliary member being clipped to a corresponding projection extending parallel to the upper side of the support element, each auxiliary member together with the corresponding projection defining a groove for the reception of the side edge of the corresponding laminate, said side edge being preferably provided with a protective cover. That is to say, the at least one clamping unit may comprise an auxiliary member for each adjacent photovoltaic laminate, each auxiliary member being clipped to a corresponding projection extending parallel to the upper side of the support element and attached to it, each auxiliary member together with the corresponding projection defining a groove for the reception of the side edge of the corresponding laminate, which may be provided with a protective cover.

The aforementioned protective cover of the side edges of photovoltaic laminates protects said laminates from forces;

for example, the clamping force of the auxiliary or T-shaped members, or vibrations that could damage the photovoltaic laminate.

According to the present invention, the support element may further comprise a stop between the auxiliary members for limiting their movement. Said stop may be an extra or separate part attached to the support element or may be integral with said support element.

According to the present invention, the support element may be attached to each adjacent photovoltaic laminate by a corresponding auxiliary member, each auxiliary member being attached to the upper side of the support element, each auxiliary member defining a groove for the reception of the side edge of the corresponding photovoltaic laminate, said side edge being preferably provided with a protective cover. That is to say, the at least one clamping unit may comprise an auxiliary member for each photovoltaic laminate, each auxiliary member being attached to the upper side of the support element and defining a groove for the reception of the side edge of the corresponding photovoltaic laminate.

According to the present invention, the articulated members may be connected in an articulated manner to their corresponding support element by an interconnection pin.

According to the present invention, the interconnection pins comprised in the first lateral face of the support elements are mutually aligned and the interconnection pins comprised in the second lateral face of the support elements are mutually aligned.

According to the present invention, the interconnection pins may be mutually aligned, that is to say, all interconnection pins that connect the articulated members to their corresponding support element may define a common pivot axis.

According to the present invention, the foldable stiffening and/or supporting structure may comprise one or more transverse members interconnecting the articulated members.

According to the present invention, the one or more transverse members may comprise one or more beams.

According to the present invention, said one or more beams may have at least one of the following cross-sections: squared, rectangular, circular, L-shaped, or U-shaped.

According to the present invention, the photovoltaic assembly may further comprise transverse reinforcements connected to its support elements.

It will be understood that references to geometric position, such as parallel, perpendicular, tangent, etc. allow deviations up to ±5° from the theoretical position defined by this nomenclature.

It will also be understood that any range of values given may not be optimal in extreme values and may require adaptations of the invention to these extreme values are applicable, such adaptations being within reach of a skilled person.

Other features of the invention appear from the following detailed description of an embodiment.

BRIEF DESCRIPTION OF THE FIGURES

The foregoing and other advantages and features will be more fully understood from the following detailed description of an embodiment with reference to the accompanying drawings, to be taken in an illustrative and non-limitative manner, in which.

DETAILED DESCRIPTION OF AN EMBODIMENT

The foregoing and other advantages and features will be fully understood from the following detailed description of an embodiment with reference to the accompanying drawings, to be taken in an illustrative and not limitative way.

Figure 1:
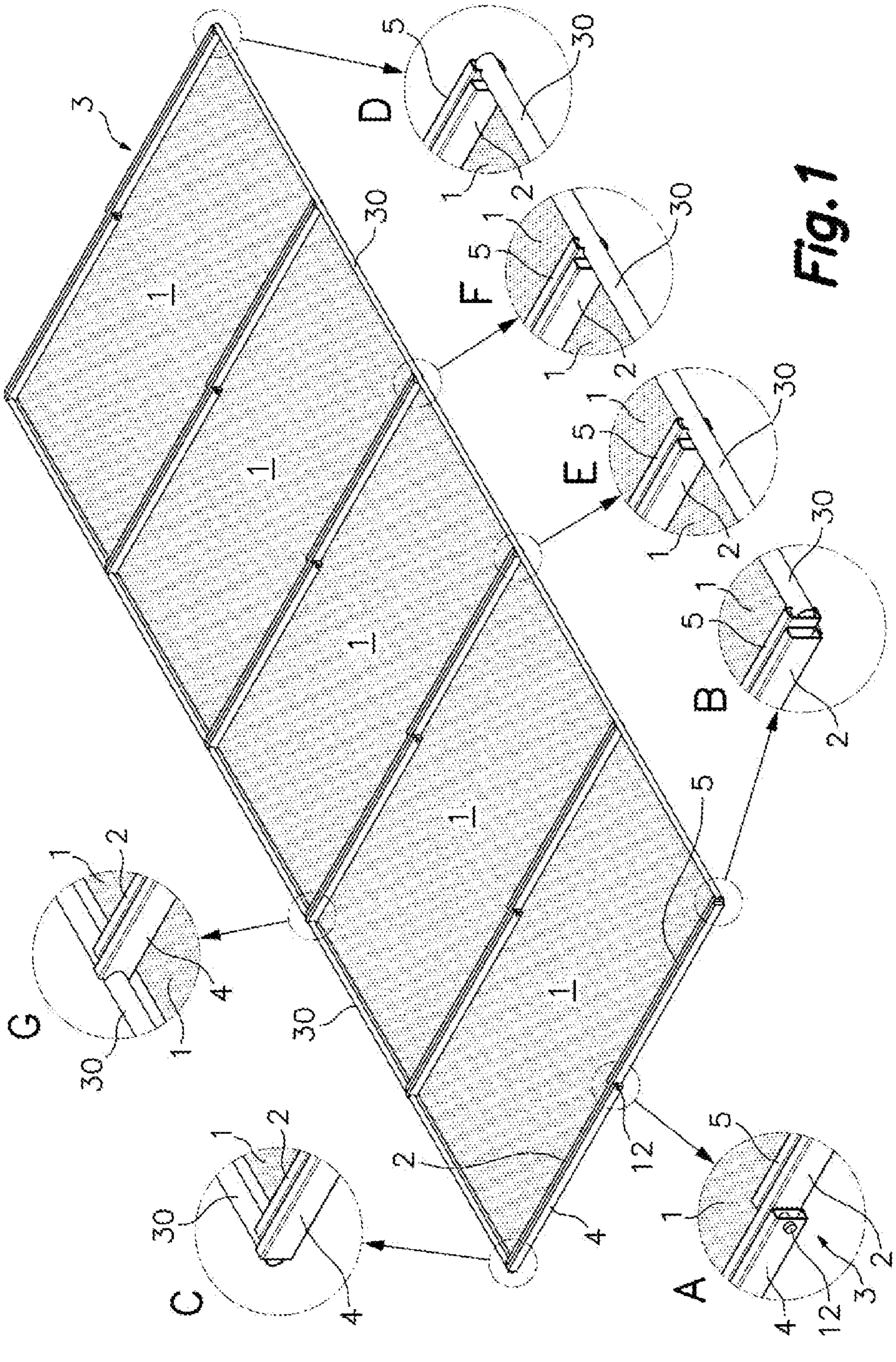
FIG. 1 shows a perspective view, including detail views A to G, of a first exemplary embodiment of a photovoltaic assembly for a portable solar energy according to the present invention, with its stiffening and/or supporting structure in a folded position.

FIG. 1 shows in a perspective view a first exemplary embodiment of a photovoltaic assembly for a portable solar energy system according to the present invention, with its foldable stiffening and/or supporting structure 3 in a folded position. In this first exemplary embodiment, the support elements 2 comprise one articulated member 4, 5 attached at each of its lateral faces (see FIG. 3).

In FIG. 1 the foldable stiffening and/or supporting structure 3 is depicted in its folded position, in which a face of the articulated members 4, 5 is substantially coplanar with the internal surface of the photovoltaic laminate 1. It is also possible that in other embodiments, in the folded position, a face of the articulated members 4, 5 is not substantially coplanar with the internal surface of the photovoltaic laminate 1. In the latter case, the face of the articulated member 4, 5 closer to the internal surface of the photovoltaic laminate 1 may be parallel to said internal surface of the photovoltaic laminate 1 (see FIGS. 4 to 7).

FIG. 1 also shows detail views A, B, C, D, E, F, G of said first exemplary embodiment.

The first exemplary embodiment shown comprises five interconnected photovoltaic laminates 1. Other embodiments of the present invention, may comprise a different number of photovoltaic laminates 1, for example, two, six, ten, etc.

The photovoltaic laminates 1 comprise an internal and an external major surface. Due to the perspective used, in FIG. 1 only the internal major surface of the photovoltaic laminates 1 can be seen. In this embodiment, the foldable stiffening and/or supporting structure 3 comprises reinforcing members interconnecting the articulated members 4,5. In this first exemplary embodiment, the reinforcing members comprise two longitudinal beams 30, each one on opposite ends following a transversal direction of the photovoltaic assembly; i.e. perpendicular to a longitudinal axis; interconnecting the corresponding articulated members 4,5. In particular, each longitudinal beams 30 is connected or joined to the corresponding articulated member 4, 5, said beams 30 being substantially parallel to the longitudinal axis of the photovoltaic assembly, and besides increasing the structural integrity of the foldable stiffening and/or supporting structure 3, said beams 30 also increase the stability of the photovoltaic assembly when it is in its working or operative position standing on the ground or any other supporting surface. Furthermore, as can be seen in detail views B to G, when the foldable stiffening and/or supporting structure 3 is in its resting or folded position, the beams protrude from the ends of the support elements 2, thus providing a perimeter frame that protect the photovoltaic assembly, for example, when being transported or lifted, among others.

In detail view A of FIG. 1 can be seen how, in this exemplary embodiment, the support elements 2 comprise one articulated member 4, 5 attached at each of its lateral faces 10 (see FIG. 3), which are perpendicular to the internal major surface of the corresponding laminate 1. These articulated members 4, 5 are pivotally attached to the corresponding support element 2 by an interconnection pin 12.

As can be seen in greater detail in detail views B to G, the exemplary embodiment shown comprises support elements 2 comprising two articulated member 4, 5. However, in other embodiments, one or more support elements 2, including the ones at the ends of the photovoltaic assembly, can comprise only one articulated member 4, 5. Other embodiments can comprise support elements 2 comprising more than two articulated members 4, 5. Although it is preferred that all support elements 2 of a photovoltaic assembly comprise the same number of articulated members 4, 5, it is also possible that a photovoltaic assembly comprises support elements 2 having different numbers of articulated members 4,5, for example, two support elements 2 having two articulated members 4,5 and four support elements 2 having one articulated member 4, 5.

These detail views also show the connection between the articulated members 4,5 and the and the corresponding beams 30 at the longitudinal ends of the photovoltaic assembly.

Figure 2:
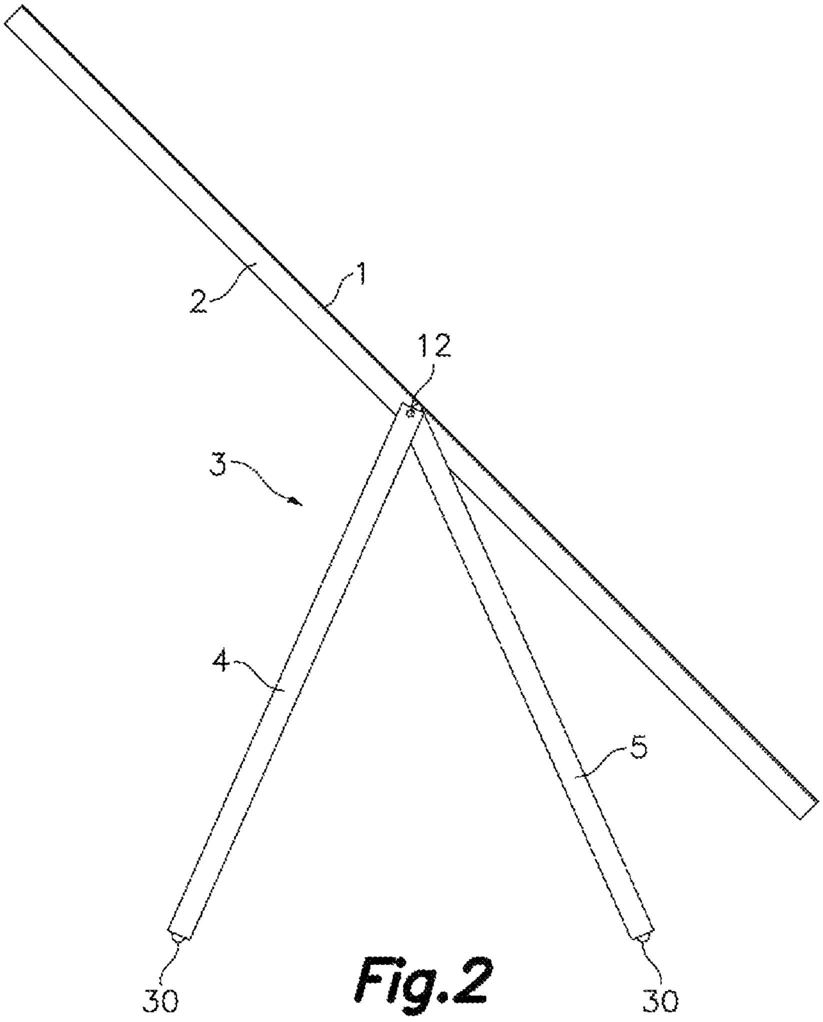
FIG. 2 shows a profile view of the first exemplary embodiment of a photovoltaic assembly shown in FIG. 1 with its stiffening and/or supporting structure in an operative position.

FIG. 2 depicts in a profile view the first exemplary embodiment of a photovoltaic assembly shown in FIG. 1, but with its stiffening and/or supporting structure 3 in an operative position. In the working or operative position, the foldable stiffening and/or supporting structure 3 supports the photovoltaic assembly and, in particular, the photovoltaic laminates 1, generally at a position that maximizes their energy production.

In the embodiment shown, in the operative position, each pair of articulated members 4, 5 are arranged to form a triangle, which rests on the ground or any other supporting surface via the beams 30. In embodiments lacking such beams 30, the articulated members 4, 5 can rest directly on the ground or any other supporting surface.

In other embodiments of the present invention, each lateral face 10*a*, 10*b* of the support element 2 (see FIGS. 3 to 7) may comprise more than one articulated member 4,5. It is also possible that in other embodiments the articulated members 4,5 comprise further articulated members attached to them in an articulated or pivotal manner, to create a more robust or stiff foldable stiffening and/or supporting structure 3, for example. Said further articulated members can also be used to form different kins of photovoltaic assembly, such as, a solar tracker.

Figure 3:
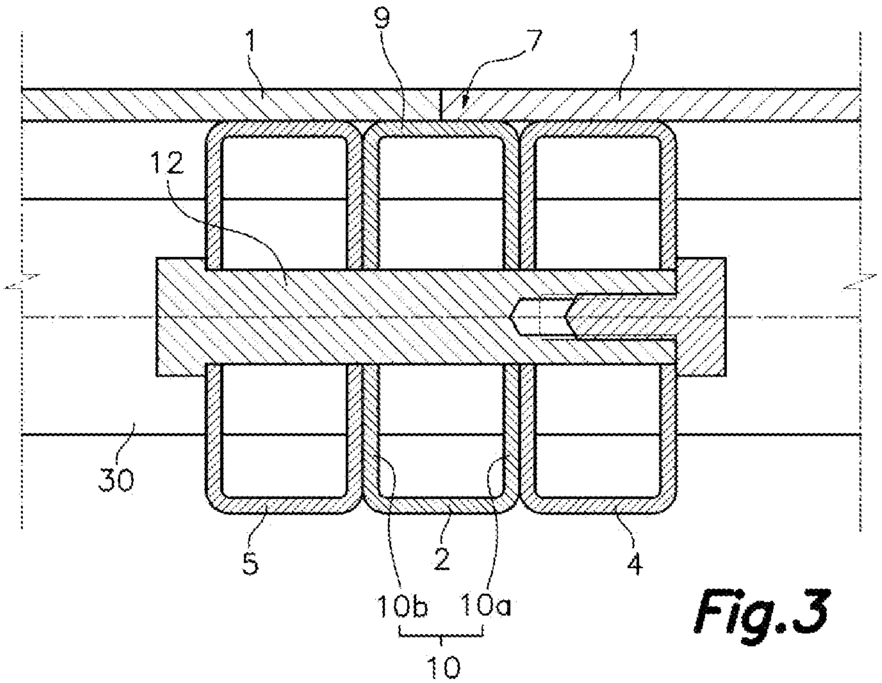
FIG. 3 shows a section view of part of the first exemplary embodiment of a photovoltaic assembly shown in FIGS. 1 and 2.

FIG. 3 shows a section of part of the first exemplary embodiment of a photovoltaic assembly shown in FIGS. 1 and 2. In particular, FIG. 3 shows a section view of a support element 2, together with the corresponding articulated members 4, 5 and the photovoltaic laminates 1, said section being done through a plane perpendicular to the internal major surface of the laminate 1 and that cuts the interconnection pin 12 through its longitudinal axis. In this embodiment two adjacent laminates 1 are joined together and to the support section 7 of the support element 2 by means of an adhesive. However, in other embodiment other attaching means can be used.

In the first exemplary embodiment, the support section 7 is defined by the top face or wall 9 of the support element 2. However, as will be seen hereinunder, in other embodiments said support section 7 of the photovoltaic laminates 1 may differ.

The support element 2 of the first exemplary embodiment shown comprises two lateral walls or faces 10 perpendicular to the internal major surface of the photovoltaic laminate 1.

This section view clearly shows how, in this exemplary embodiment, a first articulated member 4 is connected to the first lateral face 10*a* of the support element 2 and a second articulated member 5 is connected to the second lateral face 10*b* of said support element 2.

This section view also shows how, in this exemplary embodiment, a first distance from the internal major surface of the photovoltaic laminate 1 to the edge of the first lateral face 10*a* of the support element 2 is equal to a second distance from the internal major surface of the photovoltaic laminate 1 to the edge of the articulated member 4, 5 furthest from said internal major surface, i.e., the faces of the support element 2 and the articulated members 4,5 furthest from the internal major surface of the laminate 1 are coplanar. In embodiments having truss or reinforcing members interconnecting the articulated members 4,5 said second distance can be slightly larger than the first one, that is to say, in said embodiments the truss or reinforcing members of the foldable stiffening and/or supporting structure 3 can slightly protrude, for example, 1-2 cm or less, from the support element 2, but still providing a compact arrangement of the photovoltaic assembly when in its folded or inoperative position.

In embodiments lacking truss or reinforcing members of the foldable stiffening and/or supporting structure 3, depending on the dimensions of the support element 2 and of the articulated members 4,5 and on the relative arrangement between the support element 2 and the articulated members 4,5 said second distance could also be smaller than said first distance. The support element 2 has a closed cross section in order to provide the photovoltaic assembly with sufficient structural integrity. Even though the support element of the first exemplary embodiment shown has a rectangular cross section, in other embodiments the support element 2 can have a different cross section, i.e., squared. Although it is preferred to have homogeneity, it is also possible that not all support elements 2 of a photovoltaic assembly have the same cross section.

In the exemplary embodiment shown, the support element 2 is hollow. However, in other embodiments the support element 2 can be solid, i.e., not hollow.

Figure 4:
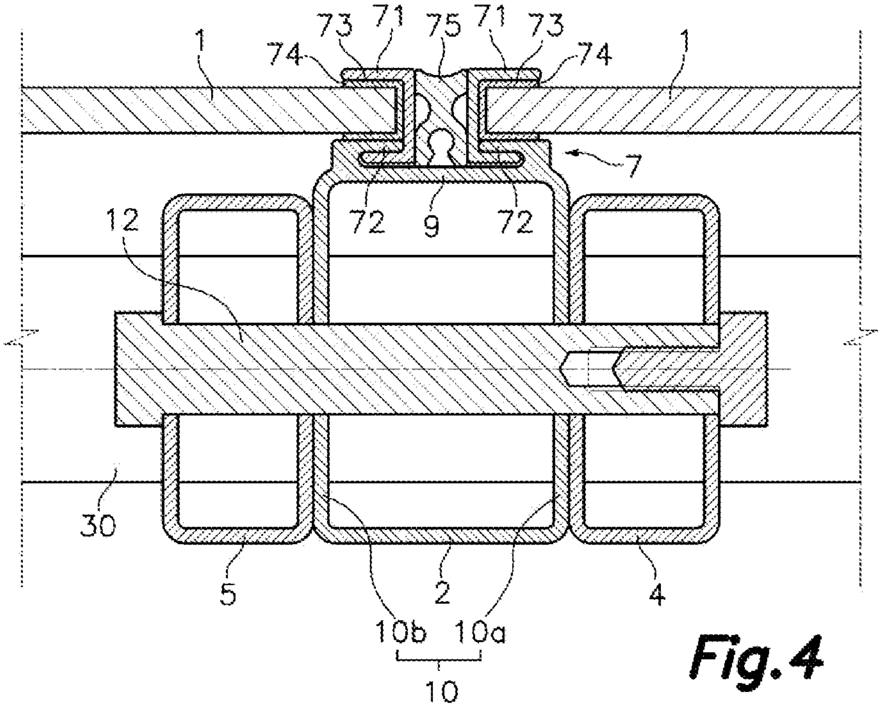
FIG. 4 shows a section view of part of a second exemplary embodiment of a photovoltaic assembly for a portable solar energy system according to the present invention.

FIG. 4 shows a section view of part of a second exemplary embodiment of a photovoltaic assembly for a portable solar energy system according to the present invention. The cutting plane of this section view is perpendicular to the internal major surface of the laminate 1 and cuts the interconnection pin 12 through its longitudinal axis. The first and second exemplary embodiments substantially differ on the support section 7. As stated hereinabove, in the first exemplary embodiment shown in FIGS. 1 to 3, the support section 7 is defined in the external surface of the upper wall 9 of the support element 2 with the photovoltaic laminates 1 being directly attached to it, whereas in the second exemplary embodiment shown in FIG. 4 the support section 7 is defined by auxiliary members 71, each auxiliary member 71 being clipped to a corresponding projection 72 extending parallel to the upper wall 9 of the support element 2. Said upper wall 9 can also be defined as the wall of the support element 2 closer to the photovoltaic laminates 1.

In this embodiment, each auxiliary member 71, together with the corresponding projection 72, defines a groove 73 for the reception of the side edge of the corresponding laminate 71. In this embodiment, the grooves 73 are substantially C-shaped. However, in other embodiments they may have a different shape.

In the exemplary embodiment shown, the side edge of the laminate 71 is provided with a protective cover 74. Although the presence of a protective cover 74 is preferred, as it protects the laminate 1 from being damaged due to, for example, the clamping or fixing force, vibrations, etc., other embodiments may lack of such protective cover 74. It is also possible that a photovoltaic assembly according to the present invention comprises some laminates 1 with a protective cover 74 and some without it.

The exemplary embodiment shown also comprises a stop 75 for limiting the movement of the auxiliary members 71. The depicted stop 75 is a separate or external part removably attached to the photovoltaic assembly. However, in other embodiments such stop 75 can be a part integral with the photovoltaic assembly. A removable stop 75 eases the assembly of the auxiliary members 71, among other benefits.

The support element 2 of this second exemplary embodiment comprises a single longitudinal pivot pin 12 that traverses the articulated members 4, 5 and the support element 2, said pivot pin 12 extending parallel to the major surfaces of the photovoltaic laminate 1. However, in other embodiments of the present invention, each side or lateral wall 10*a*, 10*b* can comprise a pivot pin 12, extending parallel to the internal major surface of the photovoltaic laminate 1, that supports the corresponding articulated member 4, 5.

In this embodiment, the grooves 73 are substantially C-shaped. However, in other embodiments they may have a different shape.

Figure 5:
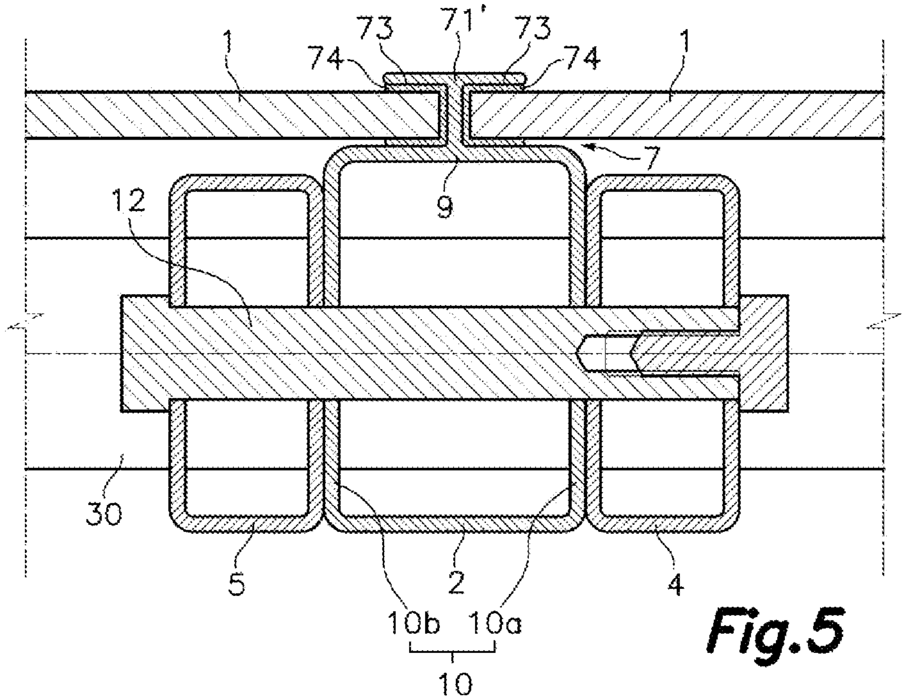
FIG. 5 shows a section view of part of a third exemplary embodiment of a photovoltaic assembly for a portable solar energy system according to the present invention.

FIG. 5 shows a section view of part of a third exemplary embodiment of a photovoltaic assembly for a portable solar energy system according to the present invention. The cutting plane of this section view is perpendicular to the internal major surface of the laminate 1 and cuts the interconnection pin 12 through its longitudinal axis. In this third exemplary embodiment the support section 7 is defined by a T-shaped member 71' extending from the upper wall 9 of the support element 2. Said T-shaped member 71' together with the upper side or wall 9 of the support element 2 define two grooves 73 for the reception of side edges of adjacent photovoltaic laminates 1.

Said T-shaped member 71' can be integral with the support element 2 or may be a separate element attached to it, by permanent or non-permanent attaching means, such as bolts, screws, glue, weld, etc.

In this third exemplary embodiment the side edge of the laminate 1 is provided with a protective cover 74. However, other embodiments of similar configurations can lack such protective covers 74.

Figure 6:
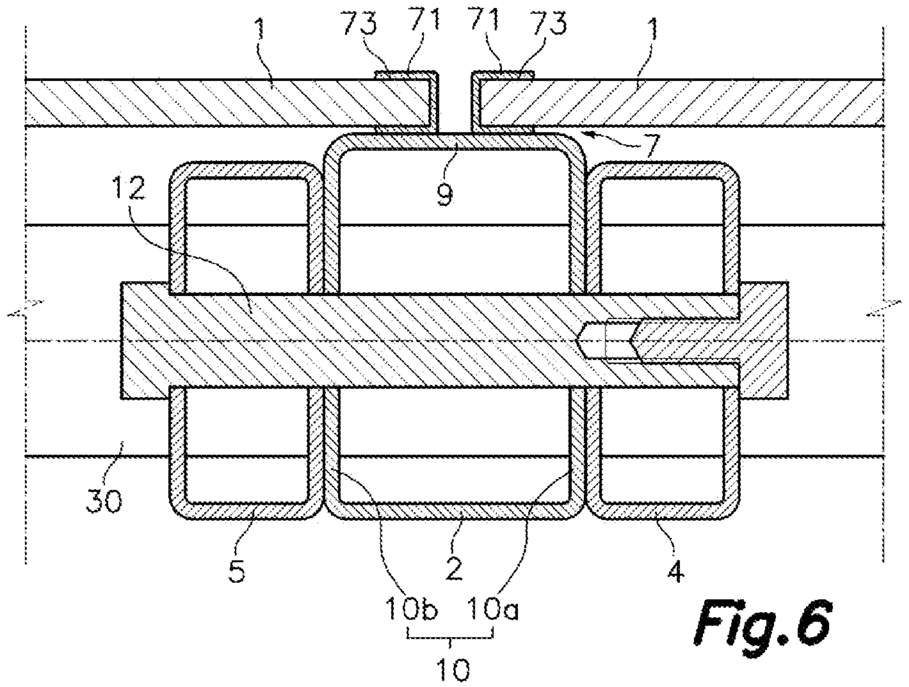
FIG. 6 shows a section view of part of a fourth exemplary embodiment of a photovoltaic assembly for a portable solar energy system according to the present invention.

FIG. 6 shows a section view of part of a fourth exemplary embodiment of a photovoltaic assembly for a portable solar energy system, said section being done through a plane perpendicular to the internal major surface of the laminate 1 and that cuts the interconnection pin 12 through its longitudinal axis. In this fourth exemplary embodiment the laminates 1 are attached to the support element 2 via a corresponding auxiliary member 71, said auxiliary member 71 being attached to the upper side or wall 9 of the support element 2.

As can be seen, each auxiliary member 71 defines a groove 73 for the reception of the corresponding side edge of the corresponding photovoltaic laminate 1. In a similar way to what has been described in the context of the second and third exemplary embodiments, in this fourth exemplary embodiment the side edge of the laminates 1 can be provided with or without a protective cover 74. In the case shown in FIG. 6, the side edges of the laminates 1 lack such protective cover 74.

Said auxiliary members 71 may be integral with the support element 2 or separate elements attached to its upper wall 9 using permanent or non-permanent attaching means, such as bolts, screws glue, weld, etc.

As can be seen, in this fourth exemplary embodiment there is a gap between the auxiliary members 71 of a support element 2. A variation of this fourth exemplary embodiment is depicted in the fifth exemplary embodiment shown in FIG. 7, which shows a section view of part of a fifth exemplary embodiment of a photovoltaic assembly for a portable solar energy system, wherein the auxiliary members 71 are in contact with each other by their wall perpendicular to the upper wall 9 of the support element 2. Besides being attached to the support element 2, the auxiliary members 71 can also be attached between them, forming an H-shaped element. Both C-shaped auxiliary members 71 can be replaced in other embodiments by a single H-shaped element. Either the C-shaped auxiliary members 71, or the H-shaped element, define two grooves 73 for the reception of the side edge of the corresponding photovoltaic laminate 1.

Figure 7:
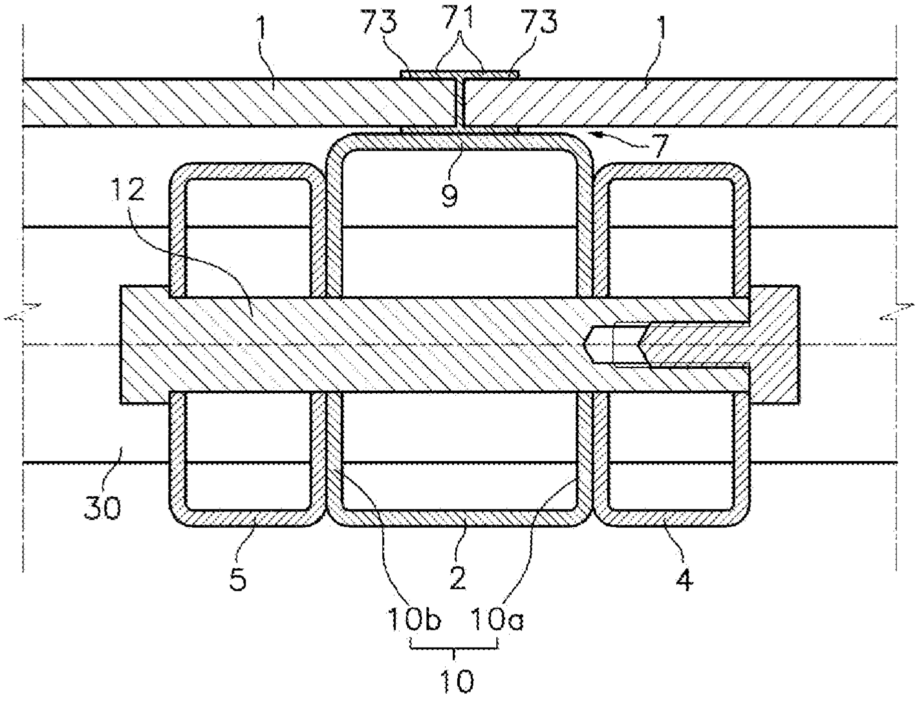
FIG. 7 shows a section view of part of a fifth exemplary embodiment of a photovoltaic assembly for a portable solar energy system according to the present invention.

The cutting plane of FIG. 7 is perpendicular to the internal major surface of the laminate 1 and cuts the interconnection pin 12 through its longitudinal axis.

In the exemplary embodiments depicted in FIGS. 4 to 7, in the folded position of the foldable stiffening and/or supporting structure 3, a face of the articulated members 4, 5 is substantially parallel to the internal major surface of the photovoltaic laminate 1. In particular, in the folded position of the foldable stiffening and/or supporting structure 3 the upper face of the articulated member 4, 5, i.e., the face of the articulated member 4, 5 closer to the photovoltaic laminate 1, is substantially parallel to the internal major surface of the photovoltaic laminate 1. In this case, the distance between said face of the articulated member 4, 5 and the internal major surface of the photovoltaic laminate 1 may be less than 5 cm. Preferably, said distance may be less than 3 cm. More preferably, said distance may be less than 2 cm. Even more preferably, said distance may be less than 1 cm.

As can be seen, the support elements 2 of the exemplary embodiments shown in FIGS. 4 to 7 also have a closed cross-section.

In any of the above-described embodiments part of the foldable stiffening and/or supporting structure 3 could protrude from the support element 2, but still providing a compact arrangement of the photovoltaic assembly when in its folded position.

As can be seen in FIGS. 1 and 3 to 7, the support element 2 and the articulated members 4, are of a substantially rectangular shape, and in the folded position of the stiffening and/or supporting structure 3 the distal surfaces of the support element 2 and the articulated members 4, 5 are coplanar, thus providing a very compact arrangement of the photovoltaic assembly when the stiffening and/or supporting structure 3 is in its folded position, for example, for transport from the manufacturing site to the installation site.

In embodiments wherein the support element 2 and/or the articulated members 4,5 have a different cross section, for example, circular, triangular, etc. the distal ends from the photovoltaic laminates 1 of the support element 2 and of the articulated members 4,5 are preferably aligned, most preferably in a plane parallel to the internal major surface of the photovoltaic laminate 1.

As stated above, the present invention provides a photovoltaic assembly for a portable energy system that can be easily transported and installed, thus reducing the transport and installation costs. Moreover, the photovoltaic assembly of the present invention can also be easily uninstalled, placed in its folded position, and transported to another location where it may be needed.

It will be understood that various parts of one embodiment of the invention can be freely combined with parts described in other embodiments, even being said combination not explicitly described, provided that such combination is within the scope of the claims and that there is no harm in such combination.

What is claimed is:

1. A photovoltaic assembly for a portable solar energy system, the photovoltaic assembly comprising:

- a row of interconnected photovoltaic laminates, each photovoltaic laminate comprising a pair of longitudinal and a pair of transverse side edges and defining an internal and an external major surface;
- a foldable stiffening and/or supporting structure comprising articulated members, the foldable stiffening and/or supporting structure being movable between a folded position and an operative position;
- wherein the stiffening and/or supporting structure further comprises at least two support elements, each support element being attached at least to the internal major surfaces, and the longitudinal side edges of adjacent photovoltaic laminates of the row of interconnected photovoltaic laminates, each support element having a closed cross-section and comprising a first lateral face perpendicular to the internal major surface of the respective adjacent photovoltaic laminates of the row of interconnected photovoltaic laminates; and wherein one or more articulated members of the foldable stiffening and/or supporting structure are connected in an articulated manner to the first lateral face of a respective support element of the at least two support elements;
- wherein a respective support element of the at least two support elements is attached to the internal and to the external major surface of two adjacent ones of the photovoltaic laminates of the row of interconnected photovoltaic laminates; and
- wherein a respective support element of the at least two support elements comprises on its upper side at least one clamping unit for clamping side edges of adjacent photovoltaic laminates of the row of interconnected photovoltaic laminates.

2. The photovoltaic assembly, according to claim 1, wherein each support element comprises a second lateral face opposite the first one.

3. The photovoltaic assembly, according to claim 2, wherein one or more articulated members of the foldable stiffening and/or supporting structure are connected in an articulated manner to the second lateral face of a respective support element of the at least two support elements.

4. The photovoltaic assembly, according to claim 1, wherein each support element of the at least two support elements is attached to respective adjacent photovoltaic laminates of the row of interconnected photovoltaic laminates by respective auxiliary members, each auxiliary member being attached to the upper side of the respective support element, each auxiliary member defining a groove for the reception of the side edge of the respective photovoltaic laminate.

5. The photovoltaic assembly, according to claim 1, wherein the support elements of the at least two support elements define a first distance from the internal major surface of at least one of a respective photovoltaic laminate in the row of interconnected photovoltaic laminates to the edge of the first lateral face farthest from said internal major surface in a direction perpendicular to said internal major surface; and wherein the articulated members of the foldable stiffening and/or supporting structure, in its folded position, define a second distance from the internal major surface to the edge of the articulated member farthest from said internal major surface in a direction perpendicular to said internal major surface; said first distance being equal or greater than said second distance.

6. The photovoltaic assembly, according to claim 2, wherein the articulated members are connected in an articulated manner to their respective support element of the at least two support elements by an interconnection pin.

7. The photovoltaic assembly, according to claim 1, wherein the foldable stiffening and/or supporting structure comprises one or more reinforcing members interconnecting the articulated members.

8. The photovoltaic assembly, according to claim 1, wherein a respective support element of the at least two support elements is attached to adjacent photovoltaic laminates of the row of interconnected photovoltaic laminates by a T-shaped member extending from the upper side of the respective support element, said T-shaped member together with the upper side of the respective support element defining two grooves for the reception of side edges of adjacent photovoltaic laminates of the row of interconnected photovoltaic laminates.

9. The photovoltaic assembly, according to claim 1, wherein a respective support element of the at least two support elements is attached to adjacent photovoltaic laminates of the row of interconnected photovoltaic laminates by an auxiliary member, said auxiliary member being attached to the upper side of the respective support element, said auxiliary member defining two grooves for the reception of side edges of adjacent photovoltaic laminates of the row of interconnected photovoltaic laminates.

10. The photovoltaic assembly, according to claim 1, wherein a respective support element of the at least two support elements is attached to adjacent photovoltaic laminates of the row of interconnected photovoltaic laminates by auxiliary members, each auxiliary member being clipped to a respective projection extending parallel to the upper side of the respective support element, each auxiliary member together with the respective projection defining a groove for the reception of a side edge of a respective photovoltaic laminate of the row of interconnected photovoltaic laminates.

11. The photovoltaic assembly, according to claim 10, wherein the support element further comprises a stop between the auxiliary members for limiting their movement.

* * * * *